United States Patent [19]
Vella-Coleiro

[11] Patent Number: 5,550,813
[45] Date of Patent: Aug. 27, 1996

[54] CELLULAR BASE STATION TRANSMIT-RECEIVE SYSTEM

[75] Inventor: George P. Vella-Coleiro, Summit, N.J.

[73] Assignee: Lucent Technologies Inc., Murray Hill, N.J.

[21] Appl. No.: 299,466

[22] Filed: Aug. 31, 1994

[51] Int. Cl.⁶ .................................................. H04B 1/56
[52] U.S. Cl. ............................. 370/24; 455/73; 370/69.1
[58] Field of Search ................................. 370/24, 38, 71, 370/30, 36, 33, 34, 69.1, 72, 121; 455/73, 90, 103, 128, 132, 347, 33.1; 379/59, 60

[56] References Cited

U.S. PATENT DOCUMENTS

| | | | |
|---|---|---|---|
| 4,223,310 | 9/1980 | Davidson et al. | 370/24 |
| 4,229,741 | 10/1980 | Groth, Jr. | 370/24 |
| 4,311,878 | 1/1982 | Berkowitz et al. | 370/24 |
| 5,200,955 | 4/1993 | McFarlane et al. | 455/18 |
| 5,239,666 | 8/1993 | Truby | 455/18 |

*Primary Examiner*—Douglas W. Olms
*Assistant Examiner*—Ajit Patel

[57] ABSTRACT

In base station cellular telephony transmit-receive systems which provide multiple channels, the transmitter and receiver circuits which respectively, modulate baseband signals on to channel carrier waves and recover baseband signals from channel carrier waves are included in homogeneous assemblies of such transmitter circuits or receiver circuits which are surface mounted on printed wiring boards. Those transmitter circuit assemblies and receiver circuit assemblies include surface mounted combiner and splitter devices, respectively, which have multiple ports connected by microstrip transmission lines to, as the case may be, the transmitter circuits or receiver circuits of the assemblies in which those devices are includes. The described arrangement results in reduction relative to the prior art in the number of coaxial cables used in such systems.

16 Claims, 5 Drawing Sheets

5,550,813

CELLULAR BASE STATION TRANSMIT-RECEIVE SYSTEM

FIELD OF THE INVENTION

This invention relates generally to base station transmit-receive systems used in cellular telephony. More particularly, this invention relates to systems of such kind in which coaxial cables are used to transmit modulated carrier channel signals between, on the one hand, channel signal processing circuits which change the frequency of those channel signals up or down from baseband, and on the other hand, signal conveying circuits interposed between such channel signal processing circuits and the system's antenna or antennas.

BACKGROUND OF THE INVENTION

Telecommunication is effected with cellular telephony base station transmit-receive systems by (a) transmission signals propagated through space from the station and occupying a wide-band of frequencies and (b) reception signals propagated through space to the station and occupying a wide-band of frequencies different from that occupied by the wide-band transmission signals. Both the wide-band transmission signal and the wide-band reception signal are subdivided into the same number X of smaller frequency bands which, although different in frequency, respectively correspond to each other one-to-one, and which respectively provide for the system X channels for the conversation. In the use of the system, the smaller frequency "channel" bands in, respectively, the wide-band transmission and reception signals and corresponding to only one channel are occupied from time to time by, respectively, transmission channel signals and reception channel signals for that one channel.

In the case of wide-band reception signals, those signals may be of two kinds, namely, main wide-band reception signals, and diversity wide-band reception signals received by, respectively, a main antenna and a diversity antenna for the base station system. Both such main and diversity wide-band reception signals occupy the same wide frequency bands and differ from each other only in respect of the antennas by which they are received.

To restate the above, a base-station transmit-receive system utilizes X channels of which each channel is different in the frequency bands employed therefor from any other of such X channels, each of the X channels being provided by (a) a channel frequency band therefor within the wide-band transmission signal, (b) a different channel frequency band therefor within the wide-band main reception signal, and (c) another channel frequency band therefor (the same in frequency as the mentioned channel band within the wide-band main reception signal) which is within a wide-band diversity reception signal in the event the system provides for diversity reception. As indicated above, "transmission channel signals" and "receiver channel signals" are signals which are contained within particular respective channel bands, and which convey conversations to be transmitted and received, respectively, by the base station. There may be two species of receiver channel signals, namely, "main receiver channels" and "diversity receiver channel signals".

A common past arrangement for the channel signal processing circuits in a base station transmit-receive system has been for all the channel signal processing circuits for each particular channel to be packaged within a common housing respective to that channel. Specifically, the transmitter circuit which produces the transmitter channel signals for "ith" channel is packaged within the same housing as the receiver circuit which processes the main receiver channel signals for that "ith" channel and, if there is diversity reception, the same housing also includes the receiver circuit which processes the diversity receiver channel signal for the "ith" channel. Such packaging in the same housing of all the channel processing circuits for each provided channel leads, however, to the required use of a large number of coaxial cables extending between the totality of such circuits in the system and the further signal conveying circuits intervening those channel frequency processing circuits and the antenna or antennas of the system. For example, if the system has 24 channels, 48 of such cables are needed if the system has no diversity reception, and 72 of such cables are needed if the system employs for reception both a main antenna and a diversity antenna. The need for the base station transmit-receive system to use such a large number of coaxial cables has, however, the disadvantages that the cost of such cables is high and the lay out of such cables becomes complicated and occupies much space.

SUMMARY OF THE INVENTION

The aforementioned and other disadvantages of prior art base station transmit-receive systems are overcome according to the invention, in one or more of its aspects, by improvements of the character set out by the claims at the end hereof.

BRIEF DESCRIPTION OF DRAWINGS

For a better understanding of the invention, reference is made to the following description of exemplary embodiments thereof, and to the accompanying drawings wherein.

Figure 1:
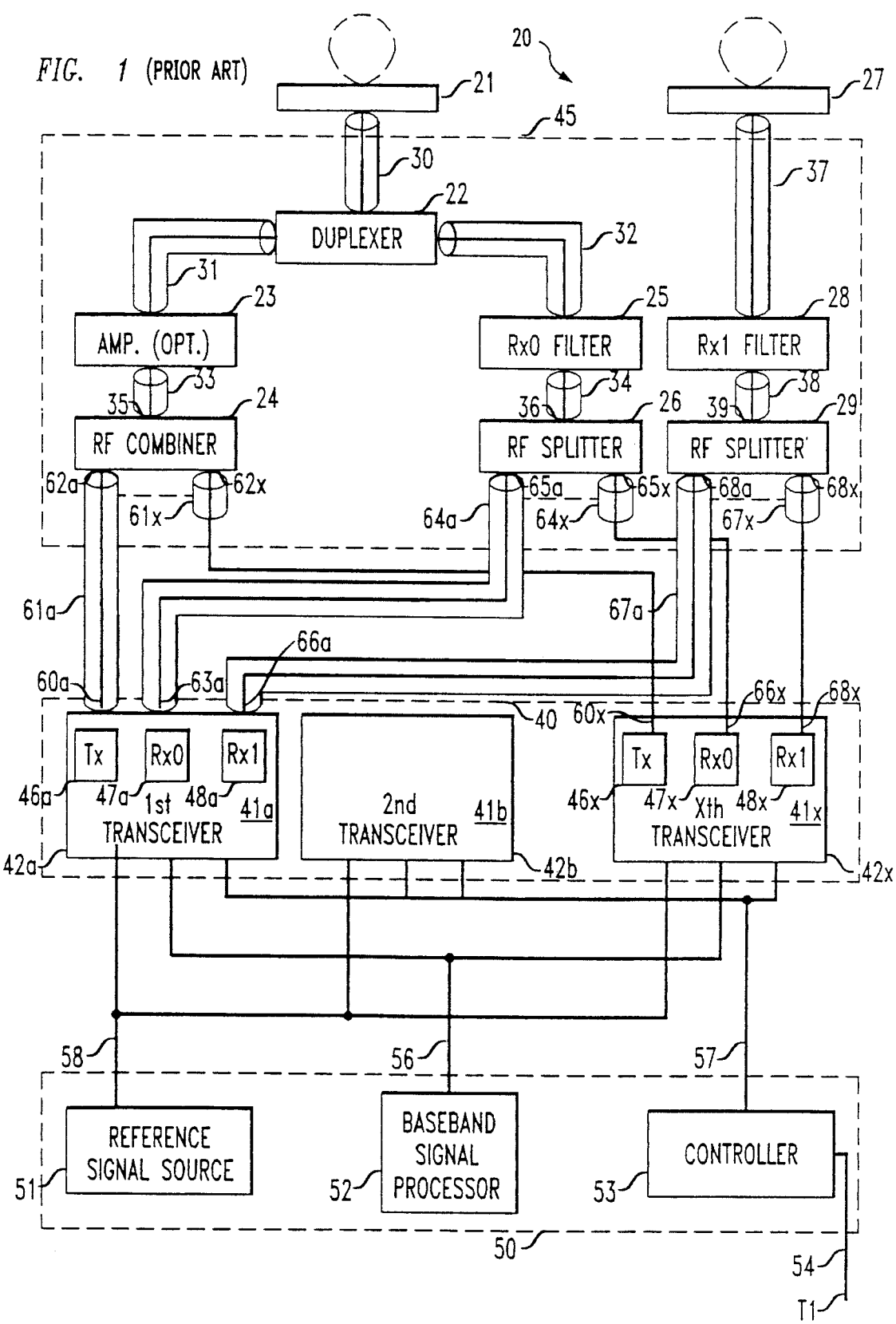
FIG. 1 is a schematic block diagram of a prior art base station cellular telephony transmit-receive system with X channels in which all the channel signal processing circuits for any particular channel are packaged within the same housing.

In the description which follows, elements which are counterparts of each are identified by the same reference numeral but are distinguished from each other by using different alphabetical suffixes for those numerals, and it is to be understood that a description of any of such elements applies, unless its context indicates otherwise, to each of its counterparts.

DESCRIPTION OF DETAILS OF EMBODIMENTS

Referring now to FIG. 1, the reference numeral 20 designates a prior art cellular telephony base station comprising a main antenna 21 for both transmission and reception, a duplexer 22, an optional amplifier 23 and combiner 24 on the transmission side, and an RXO filter 25 and splitter 26 on the reception side. Duplexer 22 may be the same as the duplexers disclosed in U.S. Pat. No. 5,274,347 issued Dec. 28, 1993 in the name of Omar J. Bobadilla for "Coaxial Fitting For Microwave Devices", and owned by the Assignee hereof, and in U.S. patent application Ser. No. 08/263,624, filed Jun. 22, 1994 in the name of Bobadilla et al for "Microwave Duplexer And Component", as a continuation of U.S. patent application Ser. No. 07/955,596, filed Oct. 2, 1992, both such applications being owned by the Assignee hereof. The combiner 24 and splitter 26 may each be provided by a "tree" of splitter-combiner devices which are of the kind disclosed in U.S. Pat. No. 5,223,809 issued Jun. 29, 1993 in the name of Robert E. Myer for "Signal Isolating Microwave Splitters/Combiners" and owned by the Assignee hereof.

Duplexer 22 is connected by coaxial cables 30, 31 and 32 to, respectively, the main antenna 21, the amplifier 23 and the filter 25. Coaxial cable 30 is included in a microwave transmission path between elements 21 and 22. Amplifier 23 and filter 25 are respectively connected by coaxial cables 33 and 34 to the single output terminal 35 of the combiner 24 and the single input terminal 36 of the splitter 26. The combinations of elements 31, 23 and 33 and of elements 32, 25 and 34 are included in separate microwave transmission paths between duplexer 22 and, respectively, the output terminal of combiner 24 and the input terminal 36 of splitter 26.

The FIG. 1 prior art system also includes a diversity antenna 27, an RX1 diversity filter 28 and a diversity splitter 29. The diversity antenna 27 is connected by a coaxial cable 37 to filter 28 which is in turn connected by a coaxial cable 38 to the single input terminal 39 of the splitter 29.

The circuits so far described and shown in FIG. 1 are included in a high frequency circuit section 45 which conveys high frequency signals (without changing their frequency) between the antennas for the system and a channel signal processing section 40 comprising a plurality of transceivers 41 which are equal in number to the number X of channels characterizing the FIG. 1 system (X here being equal to 24), and which respectively correspond, one-to-one, to those X channels. It follows that the FIG. 1 system has twenty-four transceivers 41, but, for convenience, FIG. 1 shows only the transceiver 41a for the first channel, the transceiver 41b for the second channel and the transceiver 41x for the 24th channel. Transceiver 41a is typical of all the other transceivers 41.

The transceiver 41a includes within a common housing 42a separate transmitter, main receiver and diversity receiver channel circuits 46a, 47a and 48a which separately function in relation to respectively the transmitter channel signal, the main receiver channel signal and the diversity receiver channel signal for the first channel of the FIG. 1 system. The term "channel circuits" as used herein is generic to transmitter channel circuits 46, main receiver channel circuits 47, and diversity receiver channel circuits 48.

Transceiver 41b for the second channel includes, within a common housing 42b therefor, separate transmitter channel circuits and main and diversity receiver channel circuits (none shown) which are counterparts for the second channel of (and function the same for that channel as), respectively, the circuits 46a, 47a and 48a for the first channel. Transceiver 41x for the Xth channel (i.e., the 24th channel) includes within a common housing 42x therefor, and as separate circuits a transmitter channel circuit 46x, a main receiver channel circuit 47x and a diversity receiver channel circuit 48x. The circuits 46x–48x are counterparts for the Xth channel of (and function the same for that channel as), respectively the circuits 46a–48a for the first channel. The channel signal processing section 40 includes of, of course, not only the transceivers 41a, 41b and 41x for the first, second and 24th channels for the system, but also counterpart transceivers (not shown) which are counterparts of transceiver 41a and are respective to the third through twenty-third channels for the system.

The FIG. 1 system has, in addition to the high frequency circuit section 45 and the channel signal processing section 40, a pre-channel circuit section 50 comprising a reference signal source 51, a baseband signal processor 52 and a controller 53. The signals incoming to and outgoing from the system are in the form of T1 carrier signals depicted in FIG. 1 as being transferred on wiring 54 connected to controller 53.

The transmitter channel units 46a and 46x have respective output terminals 60a, 60x which are respectively connected by the coaxial cables 61a, 61x to the corresponding input terminals 62a, 62x of the combiner 24. Further, the main receiver channel circuits 47a and 47x have respective input terminals 63a, 63x respectively connected by the coaxial cables 64a, 64x to corresponding output terminals 65a, 65x of the main splitter 26. Still further, the diversity receiver channel circuits 48a and 48x have respective input terminals 66a and 66x respectively connected by the coaxial cables 67a, 67x to corresponding output terminals 68a, 68x of the diversity splitter 29. In a similar manner, each of the other unshown transmitter channel circuits of the FIG. 1 system has an output terminal connected by a corresponding coaxial cable to a corresponding input terminal of combiner 24, and each of the other unshown main and diversity receiver channel circuits of the FIG. 1 system has an input terminal connected by a corresponding coaxial cable to a corresponding output terminal of the corresponding one of the main and diversity splitters 26 and 29 of the system.

The FIG. 1 system operates as follows. Consider first its operation in relation to incoming T1 signals which carry in TDMA format a multiplicity of baseband signals representing different conversations. Baseband processor 52 and controller 53 are each connected by wiring 56 and 57 respective thereto to each of the transceivers 41 to provide an interconnection of elements 56, 57 and 41 of such character that the various baseband "conversation" signals transported by the T1 carrier are assigned by the coordinated activities of circuits 52, 53 to selected different ones of the mentioned X-channels and are routed by way of wiring 56 to the transmitter channel circuits 46 respectively corresponding to those selected channels. Those transmitter channel circuits also receive from source 51 via wiring 58 a reference signal in the form of a high frequency wave of fixed frequency.

Each transmitter channel circuit 46 includes a synthesizer (not shown) which utilizes a phase locked loop arrangement to operate on the input reference signal to generate therefrom a high frequency channel carrier wave which is different in frequency from that reference signal and is also of different frequency for each of the twenty-four channels of the system. Within each of the circuits 46, the baseband signal transmitted thereto via wiring 56 is then modulated on the high frequency channel carrier wave generated as described in that circuit to produce a transmitter channel signal for the one of the X channels served by that circuit 46.

The plurality of transmitter channel signals thus respectively produced by one, some or all the transmitter channel circuits 46 in section 40 are conveyed from the output terminals 60 of those circuits via coaxial cables 61 to the input terminals 62 of combiner 24 which respectively correspond to the last named output terminals. Within combiner 24, all those transmitter channel signals are added together to form at the output 35 of the combiner the earlier described wide-band transmission signal.

That wide-band signal is passed through cable 33 to amplifier 23 (if present) to be amplified thereby. The signal is then passed through cable 31, duplexer 22 and cable 30 to antenna 21 to be radiated therefrom and propagated through space to mobile cellular telephone sets located remotely from base station 20.

Turning now to the reception function of station 20, signals in various ones or all of the X channels for that station are propagated through space from those mobile sets to antenna 21 to be detected thereby. Such concurrent detection of that aggregate of signals by antenna 21 constitutes, in effect, the reception by the antenna of the earlier described wide-band reception signal.

The received wide-band signal is passed through cable 30, duplexer 22 and cable 32 to filter 25 which serves to reduce passage past it of signals which are within the total bandwidth of the wide-band reception signal but not within any of its channel bands. From filter 25, the wide-band signal is passed via cable 34 to the input terminal 36 of splitter 26. Within the splitter, the single wide-band signal at its input is distributed among all of the splitter's output terminals 65 and then passed from all those terminals, via cables 64, to the input terminals 63 of all the receiver channel circuits 47.

The receiver channel circuits 47 are each provided not only with an input, as described, of the wide-band reception signal but also with inputs via wiring 58, and 57, respectively, of the reference signal from source 51 and control signals from controller 53. Each such circuit 47 has therein a synthesizer (not shown) which operates by the phase locked loop principle to generate from the reference signal a "demodulating" wave. Such "demodulating" wave operates under the control of the input signals thereto from controller 20, to mix with the wide-band reception signal input to that circuit 47 to recover from the wide-band signal the baseband signal communicated through that channel from the mobile set originating that baseband conversation signal.

The recovered baseband signal is then supplied, as an output from such circuit 47, via wiring 56, to the combination of the baseband signal processor 52 and controller 53. Such combination operates to incorporate the multiplicity of baseband signals, incoming thereto from various ones or all of the receiver channel circuits 47, into a T1 carrier signal outgoing from the FIG. 1 system on wiring 54.

In the described prior art system shown by FIG. 1, that portion of the system which provides for diversity reception (and which includes the diversity receiver channel circuits 48 in transceivers 41) is structured the same and operates in the same way as the portion of the system described above which provides for main reception. In other words, the earlier described elements 21, 30, 32, 25, 34, 36, 26, 65, 64 and 47 of the main receiver portion of the system have respective as counterparts the elements 27, 37, 28, 38, 39, 29, 68, 67 and 48 in the diversity receiver portion, and description herein of any of those earlier described elements is, unless its context indicates otherwise, to be taken as applying also to its latter named counterpart.

The FIG. 1 system has provisions therein for selecting and using the receiver channel signals derived from the diversity reception antenna 27 in lieu to those derived from the main antenna 21 when such signals from antenna 27 are stronger than those derived from antenna 21. Since such provisions are not part of the present invention they will not be described herein in detail.

In the FIG. 1 system, the wide-band transmission signal and wide-band reception signals for the system may conveniently occupy the frequency bands of 869–894 MHz and 824–849 MHz. The reference signal from reference source 51 may conveniently have a fixed frequency of 15 MHz, and the separate channel bands occupying the frequency spectrum within each of the wide-band transmission signal and wide-band reception signal may conveniently be spaced 30 KHz apart. The channel bands in the wide-band transmission signal and wide-band reception signal which respectively correspond to each other in that they belong to the same channel are spaced 45 MHz apart.

The FIG. 1 system includes, among its components, transmitter apparatus and receiver apparatus. The transmitter apparatus comprises combiner 24 and the transmitter channel circuits 46 in transceivers 41. The receiver apparatus comprises main splitter 26, diversity splitter 29 and the main and diversity receiver channel circuits 47 and 48 in transceivers 41. Because the FIG. 1 prior art system has 24 channels, and, for each of them, three channel signal processing circuits 46, 47, 48 which are coupled by corresponding coaxial cables 61, 64 or 67, as the case may be, to the combiner 24 and the splitters 26 and 29, the transmitter apparatus and receiver apparatus of the FIG. 1 system employ, between them, seventy-two of such cables. As earner discussed, the use of such a large number of coaxial cables in a base station cellular telephone transmit-receive system has a number of disadvantages.

The mentioned disadvantages characterizing the prior art FIG. 1 system are avoided by the modification of that system shown in FIG. 2, and which is as follows.

Figure 2:
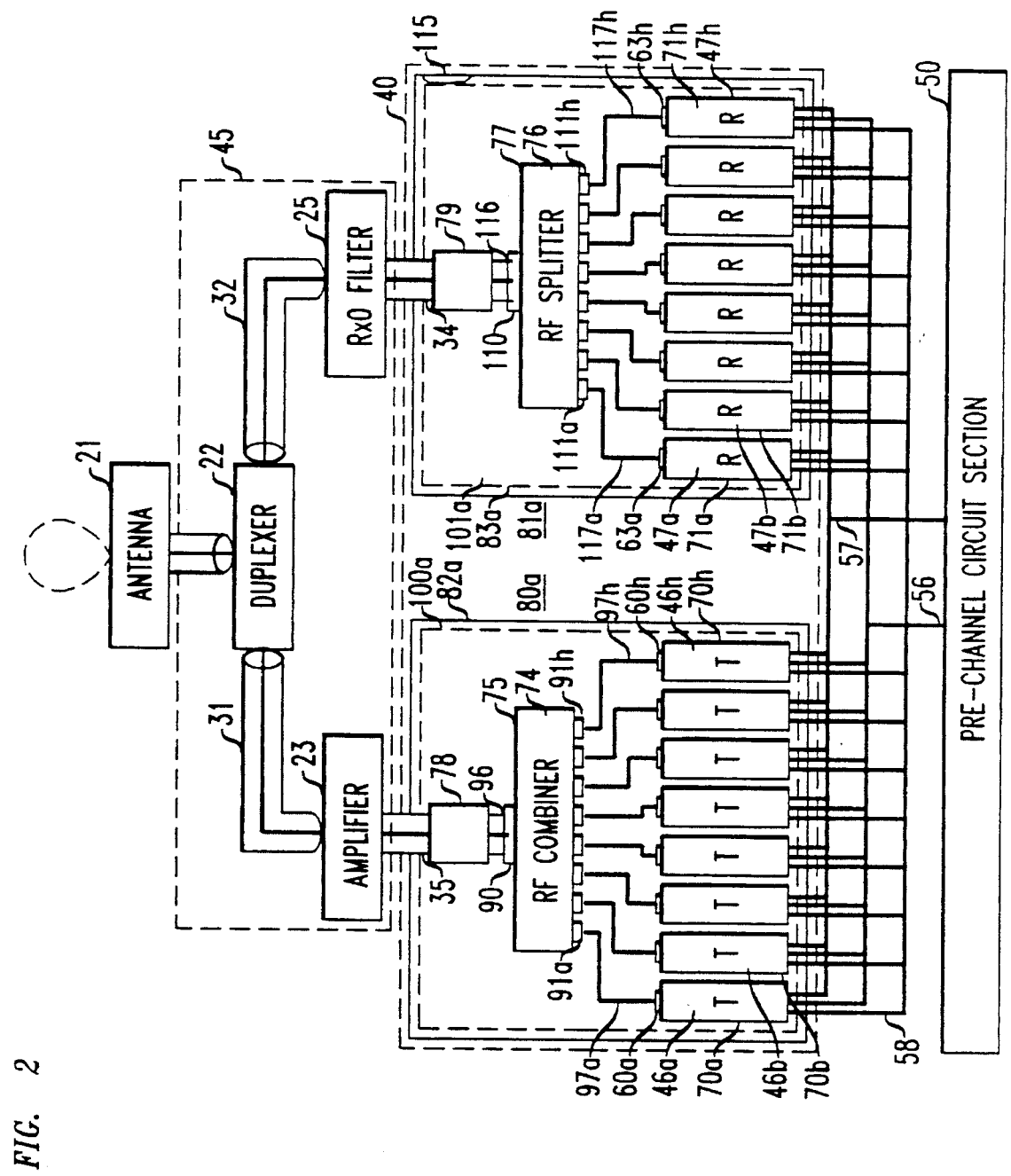
FIG. 2 is a schematic block diagram plan view of a prototype 8 channel base station cellular telephony transmit-receive system which is a modification of the FIG. 1 system and embodies exemplary improvements, according to the invention, over the FIG. 1 system.

The FIG. 2 modification changes the FIG. 1 system to eliminate the diversity reception portion thereof and to reduce the number of channels of the system from twenty-four to eight. Other changes more important to the invention hereof are as follows.

First, the transmitter channel circuits and the receiver channel circuits for any particular channel of the system have, in the FIG. 2 modification, been "unbundled" so that they are not commonly packaged within the housing of a single transceiver device. The eight transmitter channel circuits 46 shown in FIG. 2 (of which only circuits 46a, 46b and 46h are specifically designated) are carried by respective circuit packs 70. Similarly, the eight main receiver channel circuits 47 shown in FIG. 2 (of which only 47a, 47b and 47h are specifically designated) are carried by respective circuit packs 71. The circuit packs 70 and 71 for the transmitter channel circuits 46 and receiver channel circuits 47 which are respective to each of the FIG. 1 channels are, as shown in FIG. 2, circuit packs which are located remotely from each other, i.e., are not contained within the housing of a single transceiver unit for that channel.

Second, in FIG. 2, the combiner 24 and splitter 26 of FIG. 1 have been respectively replaced by combiner 74 and splitter 76 which are electric circuit components designed to be surface mounted on insulative substrate means. Surface mountable components of such sort, usable as a combiner or splitter, may be conveniently obtained for the FIG. 2 system from the Synergy Microwave Corporation having offices at 201 McClean Boulevard, Paterson, N.J. Combiner 74 and splitter 76 include respective plastic housings 75 and 77 which contain the circuitry for those electric circuit elements.

Third, in FIG. 2, all the circuit components included in the channel signal processing section 40 are mounted on supportive substrate means of insulative material which, in accordance with the invention hereof, may take various forms (as later described), but which in FIG. 2 is provided by a first surface mountable printed wiring board ("PWB") 80a for the transmitted components in section 40, and by a second surface mountable printed wiring board 81a ("PWB") for the main receiver components in section 40. The PWB's 80a and 81a are counterparts of each other in size and shape and comprise respective rectangular support sheets 82a and 83a of insulative material.

Figure 3:
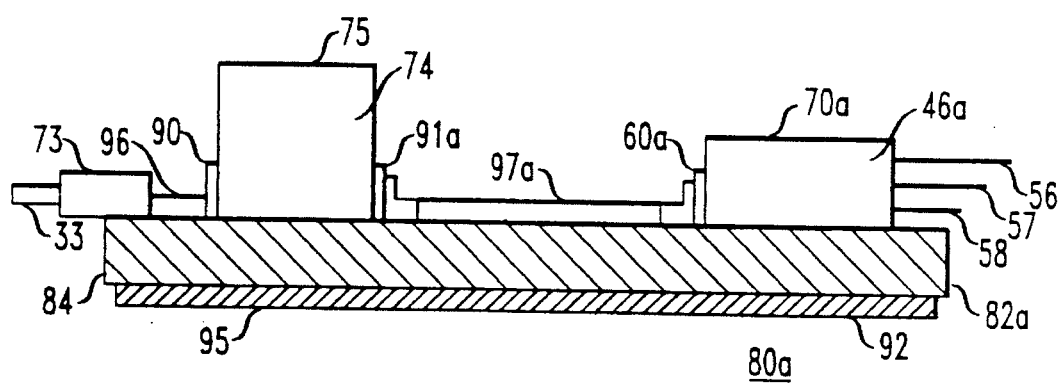
FIG. 3 is a left side elevation in cross-section, taken as indicated by the arrows 3—3 in FIG. 2, of details of part of the FIG. 2 system.

As shown by FIGS. 2 and 3, the boards 80a and 81a have thereon respective adapters 78 and 79, coupled to coaxial cables 35 and 34, respectively, and through which the other electrical components on boards 80a and 81a are coupled via those cables to the high frequency section 45. While, for convenience, adapters 78 and 79 are shown in FIG. 2 as mounted on board 80 and 81a inward of the edges thereof, in practice, those adapters are mounted at the front edges of those boards as shown for board 80a by FIG. 3.

The combiner 74 is mounted on board 80a inward of adapter 78 and has, on its front side towards the adapter, a single output terminal 90. On its side away from that adapter, combiner 74 has eight input terminals 91 (only terminals 91a and 91h being specifically designated) spaced in a row along the back side of the combiner. The transmitter channel circuits 46 on board 80a are mounted on that board between combiner 74 and the rear edge 9 of that board so that the output terminals 60 of those circuits are spaced from each other in a row of such terminals spaced from and disposed opposite the row of input terminals 91 of combiner 74. The transmitter channel circuits 46a–46h on board 80a are (as in FIG. 1) coupled by wiring 56, 57 and 58 to the pre-channel circuit section 50.

The insulative substrate sheet 82a of board 80a has on its underside (FIG. 3) a metallic (e.g., copper) ground plane 95 providing one conductor for each of various multiconductor microwave transmission lines which are elements of board 80a and are in the form of microstrip transmission lines extending in and over the two dimensional expanse of the board and its substrate 82a. One of such lines is provided by ground plane 95 and a strip 96 of metallic material (e.g., copper) deposited on substrate 82 and extending on the upper side (FIG. 3) of that substrate between adapter 78 and the output terminal 90 of combiner 74. Others of such lines are provided by ground plane 95 and by metallic strips 97 similar to strip 96 (only strips 97a and 97h being specifically designated) extending on the upper side of substrate 82 between the eight input terminals of combiner 91 and the eight output terminals 60 of the eight transmitter channel circuits 46 on board 80a so as to electrically couple, for microwave transmission, those eight input terminals, one-to-one, to those eight output terminals. As shown in FIG. 3, that electrical coupling is accomplished by having each input terminal 91 of a given number from left to right (FIG. 2) in the row of such terminals 91 coupled by a strip 97 to the output terminal 60 of the same number from left to right in the row of such terminals 60 on board 80a. As a result, each of the eight multiconductor microwave transmission lines defined (in conjunction with ground plane 95) by the eight strips 97 is non-overlapping with any other of those strips in the sense that it does not intersect with or pass under or over that other strip.

The electrical components 46, 74 and 78 mounted on board 80a, and the multiconductor microwave transmission lines 96, 97 formed on that board and coupling those components are instrumentalities which together form on that board an assembly 100a of circuit elements for effecting transmission by the FIG. 2 system and hereafter referred to as a "transmission channel component assembly". The "assembly" 100 is a homogeneous one in the sense that the area covered thereby on board 80a does not include any circuit elements of the FIG. 2 system which are present for the purpose of effecting reception thereby.

The splitter 76 and the main receiver channel circuits 47 on receiver board 81a are positioned on that board (FIG. 2) in the same lay-out as, respectively, the combiner 74 and the transmitter channel 46 on transmitter board 80a are positioned on that latter board. Splitter 76 has a single input terminal 110 and eight output terminals 111 corresponding to the eight input terminals 63 of the circuits 47 on board 81a. The splitter's input terminal 110 is coupled to adapter 79 by a microstrip transmission line provided by a metallic strip 116 on the upper side of the substrate sheet 83a of board 81a and a metallic ground plane coating 115 on the under side of insulative substrate sheet 83a of board 81a, a portion of sheet 83a being shown broken away in FIG. 2 to expose a portion of coating 115. The eight output terminals 111 of splitter 76 are coupled to corresponding ones of the eight input terminals 63 of such circuits 47 by eight microstrip transmission lines provided by the mentioned ground plane 115 and by eight metallic strips 117 on the upper side of substrate sheet 83a and respective to those eight lines. Each of those eight lines couples together a pair of such terminals of which one is an output terminal of the splitter and the other is an input terminal of a circuit 47, there being eight pairs of Such coupled terminals. The mentioned microstrip lines provided by ground plane 115 and by, respectively, strip 116 and the strips 117 are multiconductor microwave transmission lines which are respective counterparts in structure and lay-out on board 81a to the multiconductor microwave transmission lines provided on board 80a by the ground plane 95 (FIG. 3) and by, respectively, the strip 96 and the strips 97 on that last named board.

The electrical components 47, 76 and 79 on board 81a and the multiconductor microwave transmission lines provided on that board by ground plane 115 and strip 116 and the eight strips 117 are instrumentalities which together form in channel signal processing section 40 on board 81a an assembly 101a of circuit elements contributing to the performance of reception by the FIG. 2 system. Such assembly 101a is referred to herein as a receiver channel component assembly, the term "channel component assembly" being used herein as generic to both a transmitter component assembly and receiver channel component assembly. The assembly 101a is a homogeneous one in the sense that the area covered thereby on board 81 does not include any circuit element of the FIG. 2 system which is present for the purpose of effecting transmission thereby. Self-evidently there is no part of assembly 101a with overlaps with any part of the afore-described assembly 100a within the meaning given heretofore of the term "overlap".

As shown by FIG. 2, the transmitter channel component assembly 100a on board 80a and the receiver channel component assembly 101a on board 81a are the same in size and shape, and the boards 80a and 81 are of such size that they would not, either of them, effectively accommodate assemblies of such kind having more than eight transmitter channel circuits or eight receiver channel circuits, as the case may be.

With the exceptions that the FIG. 2 system lacks the diversity reception portion of the FIG. 1 system and has only eight channels instead of twenty-four, the operation of the FIG. 2 system is the same as that earlier described for the FIG. 1 system. As an important difference however (realized by application of the invention hereof), the sixteen coaxial cables 61 and 64 connecting in FIG. 1 system, for eight channels thereof, the high frequency section 45 to the transmitter and main receiver components section have been reduced in the FIG. 2 modification to only two cables, namely, the coaxial cable 33 and the coaxial cable 34. That is, the FIG. 2 modification effects an 8:1 reduction in the number of coaxial cables needed for a given number of channels to interconnect the sections 45 and 40 of a base station cellular telephone transmit-receive system.

Figure 4:
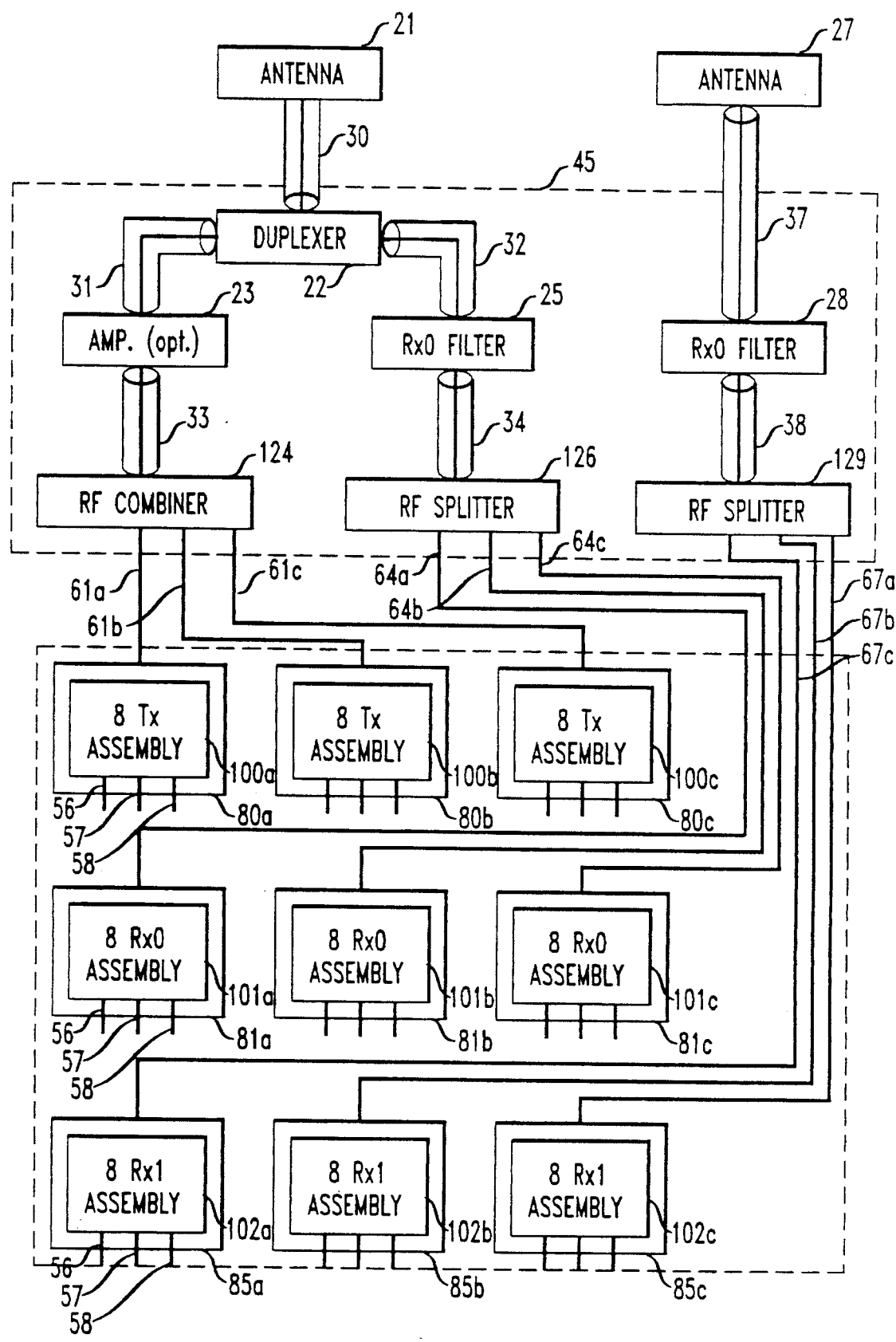
FIG. 4 is a schematic block diagram of a 24 channel base station cellular telephony transmit-receive system which is a modification of the FIG. 1 system, and which embodies exemplary improvements according to the invention for transmission of signals and reception of both main and diversity signals.

FIG. 4 shows a modification of the FIG. 1 system in which a similar reduction on a per channel basis is obtained for the number of coaxial cables required to interconnect the high-frequency section 45 of the system with its channel processing section 40. The FIG. 4 modification retains the diversity reception portion of the FIG. 1 system, and like it, utilizes twenty-four conversation channels.

The channel signal processing system 40 of FIG. 4 has in it, for transmission purposes, the PWB 80a (already described in connection with FIG. 2) having on it the transmission channel component assembly 100a. The board 80a and assembly 100a are supplemented in section 40 by counterpart transmitter boards 80b and 80c and counterpart assemblies 100b and 100c on those boards 80b and 80c, respectively. Section 40 also has in it for main reception purposes the already described PWB 81a and the reception channel component assembly 101a thereon. The board 81a and assembly 101a are supplemented in section 40 by counterpart main receiver boards 81b, 81c and counterpart main receiver channel component assemblies 101b and 101c. Such main receiver elements in section 40 are duplicated therein by diversity receiver PWB's 85a, 85b and 85c and by diversity channel component assemblies 102a, 102b and 102c on those PWB's, the elements 85a, 85b and 85c being counterparts of, respectively, the elements 81a, 81b, 81c and the elements 101a, 101b, 101c.

Each of the assemblies 100, 101 and 102 in FIG. 4 is coupled by wiring 56, 57, 58 to the pre-channel circuits section 50 (shown in FIGS. 1 and 2 but not FIG. 4) for the system. Further, in the FIG. 4 modification, the combiner 24 and the splitters 26 and 29 with ratios of 1:24 between the single port and multiple ports of the device have been replaced by a combiner 124 and splitters 126 and 129 having single port to multiple port ratios of 1:3. The combiner 124 is coupled by three coaxial cables 61a, 61b, 61c to, respectively, the three transmitter channel component assemblies 100a, 100b and 100c while the main splitter 126 is coupled by three coaxial cables 64a, 64b, 64c to respectively, the three main receiver channel component assemblies 101a, 101b, 101c. The diversity splitter is coupled by three coaxial cables 67a, 67b, 67c to, respectively, the three diversity receiver channel component assemblies 102a, 102b, 102c.

The modified base station cellular telephone transmit receive system shown in FIG. 4 operates in the same way as does the unmodified system shown in FIG. 1. The FIG. 4 modification is however superior to the prior art FIG. 1 system in that in FIG. 4 the number of coaxial cables interconnecting the high frequency section 45 and the channel signal processing system 40 is nine cables instead of seventy-two cables as in FIG. 1. That is, the FIG. 4 modification provides (like the FIG. 2 modification) a reduction of 8:1 for a given number of channels in the number of coaxial cables required to interconnect sections 40 and 45.

In FIG. 4, the transmission portion of section 40 is shown as consisting of three boards 80 with assemblies 100 thereon, and similarly, the main reception and diversity reception portions of section 40 respectively consist of three boards 81 and associated assemblies 101 and three boards 85 and associated assemblies 102. Three such board-assembly combinations are shown in FIG. 4 as used per transmission or main reception or diversity portion, as the case is, in section 40 because of the assumption that such arrangement is the most cost effective construction for the FIG. 4 system. That is, it is assumed that the largest PWB's which can be commercially obtained at a reasonable price are of the size of the boards 100, 102 and 103 which can accommodate thereon only channel component assemblies including no more per board than eight transmitter channel circuits 46 or receiver channel circuits 47 or 48 as the case may be, whence it is cheaper to use PWB's of that size and employ nine coaxial interconnecting sections 40 and 45 than to employ larger but much more expensive PWB's in section 40 while realizing some cost savings by being able to reduce interconnecting cables from nine to a lesser number. Evidently, however, the number of such coaxial cables needed on a per channel basis to interconnect sections 40 and 45 can often be further reduced from the nine shown in FIG. 4 to a lesser number if PWB's can be obtained for section 40 which can accommodate on those PWB's channel component assemblies individually including more than, say, eight circuits 46, 47 or 48 per board. That such is so will be evident from consideration as follows of the FIG. 5 modification of the FIG. 1 system.

Figure 5:
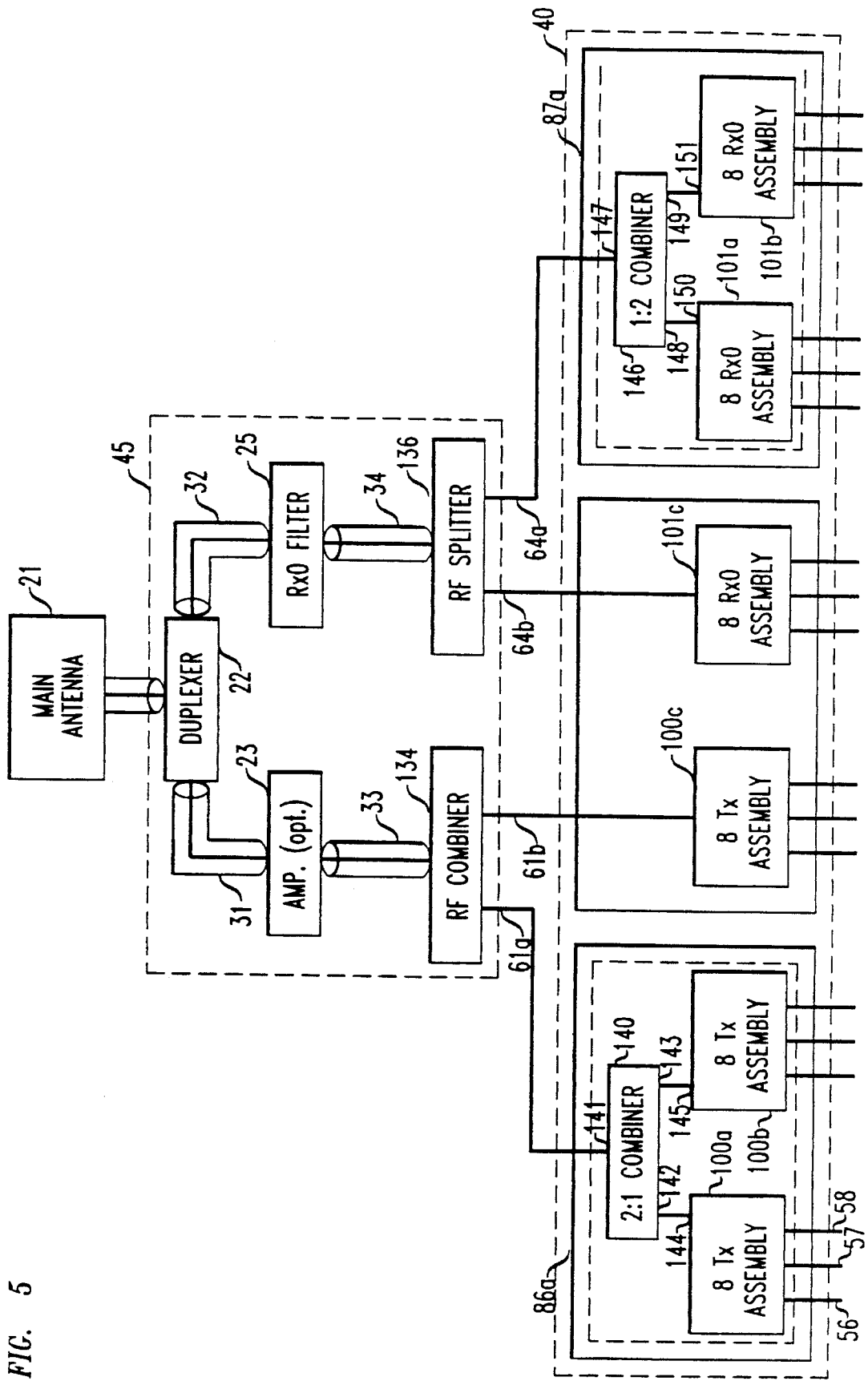
FIG. 5 is a schematic block diagram of another 24 channel base station cellular telephony transmit-receive system which is a modification of the FIG. 1 system and embodies exemplary improvements according to the invention for transmission of signals and reception of only main reception signals.

The FIG. 5 modification lacks the diversity reception portion of the FIG. 1 system but, like the FIG. 1 system, has twenty-four channels. In FIG. 5, the channel signal processing section includes PWB's 86a and 87a of the same size and shape which are larger than the boards 80, 81 and 85 of FIG. 4 so as to each be capable of accommodating two of the component assemblies 100 or 101 of FIG. 4, together with an additional surface mountable splitter or combiner. Thus, board 86 carries thereon both of the assemblies 100a and 100b shown in FIG. 5, along with a surface mountable combiner 140 housing a single output terminal 141 and two input terminals 142 and 143 electrically coupled by microstrip transmission lines 144 and 145 to the output terminals of respectively the combiner included in assembly 100a and the combiner included in assembly 100b (see FIGS. 2 and 4). Similarly, the board 87a carries thereon both of the assemblies 101a and 101b shown in FIG. 4, along with a surface mountable splitter 146 having a single input terminal 147 and two output terminals 148 and 149 respectively coupled by microstrip transmission lines 150 and 151 to, respectively, the splitter included in assembly 101a and the splitter included in assembly 101b (see FIGS. 2 and 4). The lines 144, 145, 150 and 151 are provided by metallic ground plane coatings (not shown) similar to coating 95 on the undersides of boards 86a, 87a and by metallic strips on the upper sides of those boards similar to the strip 96 (FIGS. 2 and 3).

The boards 86a and 87a accommodate between them sixteen of the transmitter channel circuits 46 and receiver channel circuits 47 needed for the twenty-four channels of the FIG. 5 modification. The remaining eight transmitter channel circuits 46 and receiver channel circuits 47 needed for those twenty-four channels are provided by the assemblies 100c and 101c both accommodated in section 40 on a board 88a which is the same in size and shape to the boards 86a and 87a. Board 88a differs however from boards 86a and 87a in that board 88a is a "mixed" board which mounts thereon both transmitter channel circuits 46 (in assembly 100c) and receiver channel circuits 47 (in assembly 101c). In contrast, boards 86a and 87a are "unmixed boards" in that 86a mounts thereon only transmitter channel circuits 45 (in assemblies 100a and 100b) and 87a mounts thereon only main receiver channel circuits 47 (in assemblies 101a and 101b). While, however, board 88a is, as described, a mixed board, nonetheless the circuits 46 and 47 on that board are segregated from each other in that they are contained within the separate non-overlapping areas covered on board 88a by the homogeneous, transmitter channel component and receiver channel component, assemblies 100c and 101c.

All of the assemblies 100a–100c and 101a–101c of the FIG. 5 modification are connected by wiring 56, 57 and 58 to the pre-channel circuit section 50 (see FIGS. 1 and 2). Further, in the FIG. 5 system, the combiner 24 and the splitter 26 of the FIG. 1 system are replaced by a combiner 134 and splitter 136 having single port to multiple port ratios of 1:2. The two input ports of the combiner 134 are respectively coupled by two coaxial cables 61a, 61b to the output terminal 141 of the combiner 140 on board 86a and to the channel signals output of assembly 100c on board 88a. The two output ports of the splitter 136 are respectively coupled by coaxial cables 64a, 64b to the input terminal 147 of splitter 146 on board 87a and to the channel signals input of assembly 101c on board 88a.

Except for the absence of a diversity reception portion, the FIG. 5 system operates in the same way as does the FIG. 1 system. The FIG. 5 system provides however the advantage over the FIG. 1 system that it has only four coaxial cables 61a, 61b, 64a, 64b interconnecting the transmission and main receiver portions of the sections 40 and 45 of the system as compared to the forty-eight coaxial cables used for that purpose in the FIG. 1 system. In other words, the FIG. 5 system provides, in comparison to the FIG. 1 system and for a given number of channels, a 12:1 reduction in the number of interconnecting coaxial cables between those sections 40 and 45.

Having discussed some examples of how to reduce the number of coaxial cables in a base station cellular telephone transmit-receive system, some conclusions which can be drawn from that discussion are as follows.

Where, as described above, (and to the end of reducing the number of coaxial cables needed to interconnect the high frequency and channel signal processing sections of a cellular telephony base station system ), the channel signal processing section is designed to comprise one or more homogeneous assemblies of (a) a combiner and transmitter channel circuits, and (b) of a splitter and receiver channel circuits, which assemblies, all of them, are mounted on one or more PWB's or supportive substrate means of insulative material, then the extent to which such cable reduction can be effected is limited by one or the other of two controlling factors.

The first of those factors is whether or not there is a limit to the ratio of the number of output ports to single input port which can be provided by the combiner means (or the splitter means) which is mounted on the insulative substrate, and which must (in order to avoid use of coaxial cables) be connected by microstrip transmission lines, (or other multiconductor microwave transmission lines, such as stripline) united with the substrate to the transmitter channel circuits (or receiver channel circuits) associated therewith. For example, if such combiner means can consist at most of the combiner 74 shown in FIG. 2 for which the ratio of output ports to input port is only 8:1, then we have the situation shown in FIG. 4 where the use of three combiners in the three assemblies 100, 101, 102 along with three splitters in each of the three assemblies 100, 101 and 102, makes necessary the use of nine coaxial cables between sections 45 and 40, irrespective of the number of transmitter circuit components (or receiver circuit components) which can be accommodated per board on the boards 80a, 81a, 85a in FIG. 4.

Usually, however, the multiple-port single-port ratio of the combiner means or splitter means can be increased as desired by the use of trees of combiners (or splitters) mounted on the insulative substrate means and coupled together by, say, microstrip transmission lines (see FIG. 5). In that instance, such ratio can usually be made large enough to not be a factor controlling the extent to which the number of the coaxial cables discussed can be reduced.

The factor which then becomes controlling is the size of the greatest size PWB's which are commercially available at reasonable cost, and the consequent greatest number of transmitter channel circuits (or receiver channel circuits) which can be accommodated in an assembly 100, 101 or 102 on a board. The insulative substrate means for the transmitter and receiver circuit components can, at reasonable cost, be a board of as great a size as desired, then the channel signal processing section 40 for the described twenty-four channel system can comprise a single such board mounting a single assembly 100 including twenty-four transmitter channel circuits, a single assembly 101 including twenty-four main receiver channel circuits 47, and a single assembly 102 including twenty-four diversity receiver channel circuits 48. In that case, the number of coaxial cables between sections 40 and 45 is brought down to the irreducible lower limit of p cables where p is the number of functions of transmission, main reception and diversity reception performed by the system considered, p being equal to 3 for the FIG. 1 and FIG. 4 systems, and being equal to 2 for the FIG. 2 and FIG. 5 systems. The same result of lowering the number of such cables to the irreducible limit of p of such cables can also be obtained by subdividing the previously considered one board into three such boards which mount respectively assemblies 100, 101, 102 each including twenty-four transmitter circuit components or receiver circuit components as the case may be.

When, however, it is not commercially feasible to obtain boards of a size large enough to each mount on one of such boards a number of transmitter (or receiver) circuit components equal to the number of channels characterizing the considered system, then it is not possible to reduce the number of cables between sections 40 and 45 of the system to the lower limit of p cables. Instead, if the number of channels for the system is x and each board used in section 40 can accommodate thereon only a number y (less than x) of transmitter (or receiver) channel circuits, then the number n of boards which will be required in section 40 to provide transmitter (or receiver) channel circuits for implementing any one of the p functions is obtained by performing the following calculations. The number x is divided by the number y to derive a quotient of the form m+k/y where m is the integral quotient, k is the integral remainder and k/y is the fractional remainder. If a result of the division is that k=0, set n equal to m, but if a result of the division is that k is greater than zero, then set n equal to (m+1). If this is done, the number of coaxial cables required between sections 40 and 45 for a cellular telephony base station performing p functions is reduced from xp cables (the FIG. 1 system) to np cables (the FIGS. 2, 4 and 5 systems). Also, no more than np of boards 80, 81 and 85 will be required in the channel signal processing section 40.

On occasion, the number of such boards so required in section 40 can be reduced to below np in number. A circumstance where this cannot be done is where the number kp is greater than the number y. If, however, kp is equal to or smaller than y then the boards required to be used in section 40 can be reduced below np in number by the use of a combination of mixed and unmixed boards.

As a specific example, of what has just been stated, in the FIG. 5 modification the quantities x, y and p have respective values of 24, 16 and 2. Since the division of y into x yields a quotient consisting of an integer m=1 plus a fractional remainder of k/y=$8/16$, the number n is set to (m+1) or 2, and np (i.e., 2×2) cables are required between sections 40 and 45, namely the shown cables 61a, 61b, 64a, 64b. Since the unmixed board 86a can accommodate only sixteen transmitter channel circuits 46 out of the twenty-four required for the twenty-four channels of the system, evidently another eight of those circuits 46 must be mounted somewhere else than on board 86a. Similarly, since the unmixed board 87a can accommodate only sixteen main receiver channel circuits 47 out of the twenty-four required for such twenty-four channels, another eight of such circuits 47 must be accommodated somewhere other than board 87a. It is not necessary however that such eight other circuits 46 and eight other circuits 47 must be respectively accommodated on two additional unmixed "transmitter" and receiver boards which, if done, would raise the total of such boards to the same number np as the number of such coaxial cables. Instead, since the quantity kp (i.e., 8×2) is equal to (i.e., not greater) than y (equal to 16), it is known that those eight other transmitter channel circuits and eight other receiver channel circuits can both be accommodated on one more board which has the same size as boards 86a and 87a and, thus, the same capacity as those boards to accommodate thereon sixteen channel circuits (i.e., transmitter or receiver channel circuits). The board 88a in FIG. 5 is such a mixed board having thereon the eight circuits 46 and eight circuits 47 left over after the first sixteen of each of circuits 46 and 47 had been accommodated on boards 86a and 87 respectively. By the use of the mixed board 88a, the total number of boards used in FIG. 5 is reduced to np−1 or one less than the number np of coaxial cables required in that system between sections 40 and 45.

To give another example of how the number of boards used in section 40 can be reduced below the number of cables required to interconnect sections 40 and 45, assume that in the FIG. 4 modification, the boards 80a, 81a, 85a are capable of each accommodating eighteen transmitter (or receiver) channel circuits in the transmitter and receiver channel component assemblies thereon, and the combiner and splitters in those assemblies each have multiple-port to single-port ratios of 18:1. In that circumstance, the quantities x, y and p have respective values of 24, 18 and 3, the division of y into x yields a a quotient consisting of an integer m=1 plus a fractional remainder of k/y=$6/18$, the number n is set to m+1 or 2, and np (i.e., 3×2) coaxial cables will be required between sections 40 and 45. In that circumstance, since the quantity kp is equal to y (i.e, not greater than y) the six of each of the transmitter, main receiver and diversity receiver channel circuits, which are left over after mounting eighteen of each of them on their corresponding unmixed boards 80a, 81a and 85a), can all be mounted on separate non-overlapping assemblies on one additional mixed board alike to and supplementing in section 40 the unmixed boards 80a, 81a, and 85a. By so doing, the number of boards required is reduced to np−2 boards which is two less than the np cables required between sections 40 and 45.

If, instead of each of boards 80a, 81a and 85a being capable of accommodating eighteen channel circuits thereon, those boards are capable of accommodating only seventeen channel circuits, the number of boards required to be used in section 40 can nonetheless be reduced in that section to one less than the such required number np of coaxial cables between sections 40 and 45 by mounting assemblies including seventeen of such circuits on each of boards 80a, 81a and 85a, and supplementing in section 40 those three unmixed boards by two mixed boards of which one accommodates thereon two of the left over groups of seven channel circuits, and of which the other accommodates thereon the remaining or third left over group of seven channel circuits.

The above-described embodiments being exemplary only, it is to be understood that additions thereto, omissions therefrom and modifications thereof can be made without departing from the spirit of the invention. For example, while the described channel component assemblies (transmission and reception) have been disclosed as surface mounted on printed boards, they may be mounted in other ways on the PWB's. As another example, while the multi-conductor microwave transmission lines have been disclosed as being microstrip lines, they may also be striplines. Accordingly, the invention is not to be considered as limited save as is consonant with the recitals of the following claims.

I claim:

1. A base station cellular telephone transmit-receive system comprising:

antenna means for radiating and detecting, respectively, first and second wide-band microwave transmission and reception signals each subdivided into smaller frequency bands providing a plurality of channels common to said first and second signals, and for conveying different conversations in said channels;

a transmitter apparatus comprising, a plurality of transmitter channel circuits respectively corresponding to said channels and having respective output terminals in a set thereof, said transmitter channel circuits being responsive to baseband signals and operable to produce at said set of transmitter channel circuits output terminals a plurality of modulated carrier transmitter channel signals respective to and for said plurality of channels in said first signal, and a signal combiner having an output terminal and a set of input terminals numerically corresponding to and coupled to said output terminals of said transmitter circuits, said combiner being responsive to concurrent applications of transmitter channel signals to corresponding ones of said signal combiner input terminals to combine said transmitter channel signals into said first wide-band signal and deliver said first signal to said signal combiner's output terminal;

a receiver apparatus comprising, a signal splitter having an input terminal and a set of output terminals respectively corresponding to said channels in said second wide-band signal, said splitter being responsive to application to said signal splitter input terminal of said second signal to distribute said second signal to appear at each of said signal splitter's output terminals, and a plurality of receiver channel circuits having respective input terminals in a set thereof and numerically corresponding and coupled to said output terminals of said splitter to have said second signal appear at said input terminals of said receiver channel circuits, said receiver channel circuits being operable to recover baseband signals from said second signal appearing at said input terminals of said receiver channel circuits;

a duplexer having a T-junction coupled by first and second microwave transmission paths to, respectively, said output terminal of said combiner and said input terminal of said splitter, and coupled by a third microwave transmission path to said antenna means;

supportive substrate means of insulative material for mounting said transmitter apparatus and receiver apparatus so that said set of said input terminals of said combiner and said set of said output terminals of said transmitter channel circuits are sets which are spaced from and disposed opposite each other, and so that said set of said output terminals of said splitter and said set of said input terminals of said receiver channel circuits are sets which are also spaced from and disposed opposite each other;

a plurality of first multi-conductor microwave transmission lines disposed adjacent to said substrate means to connect each of said signal combiner's input terminals and a corresponding one of said output terminals of said transmitter channel circuits; and a plurality of second multi-conductor microwave transmission lines disposed adjacent to said substrate means to connect each of said splitter's output terminals and a corresponding one of the input terminals of said receiver channel circuits.

2. The system according to claim 1, wherein each of said first and second multiconductor microwave transmission lines follow respective paths, and said respective paths are non-overlapping.

3. The system according to claim 1 in which each of said first and second multi-conductor lines comprises two conductors which are spaced from each other by said insulative material of said substrate means, and in which at least one of the conductors of each of said lines is provided by a metallic strip on the surface of said substrate means.

4. The system according to claim 1 in which said transmitter apparatus and said receiver apparatus are mounted on said substrate means to occupy different non-overlapping areas of said substrate means.

5. The system according to claim 1 in which said supportive substrate means comprises first printed wiring board means mounting said transmitter apparatus, and second printed wiring board means separate from said first board means and mounting said receiver apparatus.

6. A base station cellular transmit-receive system comprising:

antenna means for radiating and detecting, respectively, first and second wide-band microwave transmission and reception signals each subdivided into smaller frequency bands providing a plurality of X channels which are common to said first and second signals;

a source of a reference signal;

a source of baseband signals representing different conversations;

a channel signal processing section comprising a plurality of channel circuits which are transmitter channel circuits and a plurality of channel circuits which are receiver channel circuits, said transmitter channel circuits having respective output terminals and being responsive to said reference signal and baseband signals to produce at said output terminals of said transmitter channel circuits a plurality of modulated carrier transmitter channel signals respective to and for said plurality of channels in said first signal, and said receiver channel circuits having respective input terminals and being responsive to appearance of said second signal at said input terminals of said receiver channel circuits to demodulate said second signal to recover therefrom baseband signals respective to and for said channels;

combiner means having an output, and a plurality of inputs respectively coupled to corresponding ones of said input terminals of said transmitter channel circuits to derive therefrom and produce at said combiner means output said first wide-band signal;

splitter means having an input, and having a plurality of outputs respectively coupled to corresponding ones of said input terminals of said receiver channel circuits to distribute said second wide-band signal to each of said receiver channel circuits;

a high frequency circuit section comprising at least a duplexer for conveying said first wide-band signal from said output of said combiner means to said antenna means, and for conveying said second wide-band signal from said antenna means to said input of said splitter means;

a plurality of coaxial cables for conveying signals between said high frequency section and said channel signal processing section, a plurality of printed wiring boards in said channel signal processing section;

a transmitter channel component assembly on a first board in said plurality of printed wiring boards, said transmitter channel component assembly comprising, a plurality of said transmission channel circuits mounted on said first board to have said output terminals of said transmission channel circuits spaced from each other in a row on said first board, a combiner forming at least part of said combiner means and mounted on said first board, said combiner having an output and having inputs spaced from each other in a row en said first board opposite said output terminals of said transmission channel circuits, a plurality of microstrip transmission lines disposed adjacent to said first board to each electrically couple a respective one of said inputs of said combiner to a corresponding one of said output terminals of said transmission channel circuits, a first adapter mounted on said first board outward of said output of said combiner, said adapter being coupled to a first of said coaxial cables, and a microstrip transmission line disposed adjacent to first board of electrically couple said adapter to said output of said combiner; and a receiver channel component assembly on a second board in said plurality of printed wiring boards comprising, a plurality of said receiver channel circuits mounted on said second board to have said input terminals of said receiver channel circuits spaced from each other in a row on said second board, a splitter forming at least part of said splitter means and mounted on said second board, said splitter having an input and having outputs spaced from each other in a row on said second board opposite said input terminals of said receiver channel circuits, a plurality of microstrip transmission lines disposed adjacent to said second board to each electrically couple a respective one of said outputs of said splitter to a corresponding one of said input terminals of said receiver channel circuits, a second adapter mounted on said second board outward of said input of said splitter, said second adapter being coupled to a second one of said coaxial cables, and a microstrip transmission line disposed adjacent to said second board to electrically couple said second adapter to said input of said splitter.

7. The system according to claim 6 in which said plurality of printed wiring boards mount a plurality of Y channel circuits, said channel circuits being one of said transmission channel circuits and said receiver channel circuits, where Y is a number less than the number X of said channels.

8. The system according to claim 7 in which said plurality of printed wiring boards mount among them N channel component assemblies being one of said receiver channel component assembly and said transmitter channel component assembly where, upon dividing Y into X, N is set equal to an integral quotient M of such division if such division results in no remainder, while N is set equal to M+1 if such division results in a remainder, where p is the number of the functions of transmission, main reception and diversity reception performed by said base station transmit receive system, and the number of said coaxial cables is equal to the product NP.

9. The system according to claim 7 in which said first board is an unmixed board having said transmitter channel component assembly and includes Y transmitter channel circuits, said second board is an unmixed board having said receiver channel component assembly and which includes Y receiver channel circuits, and in which said plurality of printed wiring boards comprise a third printed wiring board which is a mixed board mounting at least one transmitter channel component assembly including less than Y transmitter channel circuits and at least one receiver channel component assembly including less than Y receiver channel circuits in non-overlapping relation with said at least one transmitter channel component assembly, the total number of said printed wiring boards in said channel signal processing section being less than the product NP of said coaxial cables.

10. A base station cellular telephone transmit-receive system for use with an antenna that radiates a first wide-band microwave transmission signal and detects a second wide-band microwave reception signal, wherein said first and second signal are subdivided into a plurality of smaller frequency band channels, said system comprising:

a transmitter device receiving baseband signals and electrically connected to said antenna, said transmitter device comprising, a plurality of transmitter channel circuits corresponding to said plurality of channels, each of said transmitter channel circuits outputting a carrier transmitter channel signal based on said baseband signals, and a signal combiner outputting said first signal to said antenna, said signal combiner concurrently receiving each said carrier transmitter channel signal from each of said transmitter channel circuits, said signal combiner combining said each received carrier transmitter channel signal into said first wide-band signal;

a receiver device outputting said baseband signals and electrically connected to said antenna, said receiver device comprising, a plurality of receiver channel circuits corresponding to said plurality of channels, each of said receiver channel circuits receiving a carrier receiver channel signal based on said second signal, said each of said receiver channel circuits outputting said baseband signals, and a signal splitter receiving said second signal from said antenna, said signal splitter deriving and distributing receiver channel signals from said second signal, said signal splitter concurrently outputting each of said receiver channel signals to a corresponding one of said receiver channel circuits;

a substrate device mounting at least said transmitter device and said receiver device;

a plurality of first multi-conductor microwave transmission lines disposed adjacent to said substrate device to connect said signal combiner to said corresponding transmitter channel circuits; and a plurality of second multi-conductor microwave transmission lines disposed adjacent to said substrate means to connect said signal splitter to said corresponding receiver channel circuits.

11. The base station cellular telephone transmit-receive station according to claim 10, further comprising a duplexer device electrically connected to said signal combiner, to said signal splitter and to said antenna.

12. The base station cellular telephone transmit-receive system according to claim 10, wherein said signal combiner includes input terminals spaced from and disposed opposite to output terminals of said transmitter channel circuits, and said signal splitter includes output terminals spaced apart and disposed opposite to input terminals of said receiver channel circuits on said substrate device.

13. The base station cellular telephone transmit-receive system to claim 10, wherein said plurality of first multi-conductor microwave transmission lines electrically connect said signal combiner to each of said transmitter channel circuits and said second multi-conductor microwave transmission lines electrically connect said signal splitter to each of said receiver channel circuits, each of said first and said second multi-conductor microwave transmission lines having non-overlapping paths.

14. The base station cellular telephone transmit-receive system according to claim 10, wherein each of said first and said second multiconductor microwave transmission lines comprises a first conductor spaced apart by an insulative material of said substrate device from a second conductor that includes a metallic strip on the surface of said substrate device.

15. The base station cellular telephone transmit-receive system according to claim 10, wherein said substrate device includes a first printed wiring board mounting said transmitter device and a second printed wiring board mounting said receiver device.

16. The base station cellular telephone transmit-receive system according to claim 10, further comprising:

a transmitter assembly that includes at least one said transmitter device and a coaxial cable; and a receiver assembly that includes at least one said receiver device and a coaxial cable.

* * * * *